Figure 5:
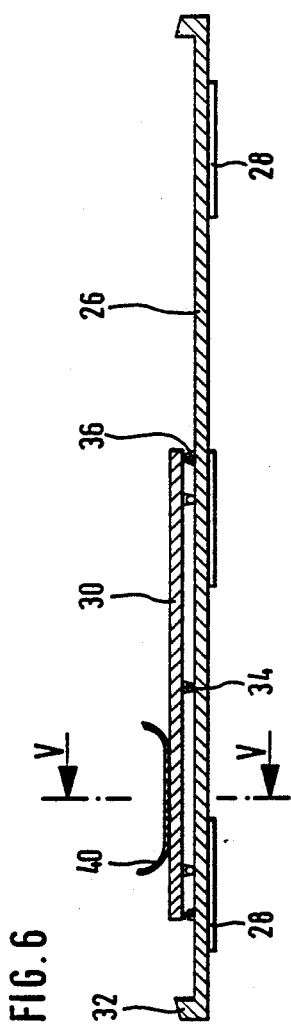

United States Patent [19]

Steinhilber

[11] Patent Number: 4,892,347

[45] Date of Patent: Jan. 9, 1990

[54] APPARATUS FOR SAVING AND PROTECTING THE SHOES OF THE DRIVER OF A MOTOR VEHICLE

[76] Inventor: Helmut Steinhilber, Sonnenbergstr. 40, CH-6052 Hergiswil Schweiz, Fed. Rep. of Germany

[21] Appl. No.: 202,189

[22] Filed: Jun. 2, 1988

[30] Foreign Application Priority Data

Jun. 3, 1987 [DE] Fed. Rep. of Germany ....... 3718581

[51] Int. Cl.$^4$ .............................................. B60N 3/06
[52] U.S. Cl. ....................................... 296/75; 180/90.6
[58] Field of Search .............................. 296/97.23, 75; 180/90.6; 280/169; 74/512, 513

[56] References Cited

U.S. PATENT DOCUMENTS

| | | | |
|---|---|---|---|
| 2,680,385 | 6/1954 | Estin | 296/75 |
| 3,094,350 | 6/1963 | Cusick | 180/90.6 |
| 3,114,272 | 12/1963 | Sawyer | 180/90.6 |

Primary Examiner—Johnny D. Cherry
Assistant Examiner—Joseph D. Pape

[57] ABSTRACT

While driving, the foot of the driver of a motor vehicle moves frequently back and forth between the gas pedal (22) and the braking pedal (24). In order to prevent the heavy wear of the shoe in the heel region caused by this motion, a device is described which provides a support device (belt band 20) for resting the foot, which support device is movable in cross direction in front of the gas pedal (22) and in front of the braking pedal (24).

21 Claims, 2 Drawing Sheets

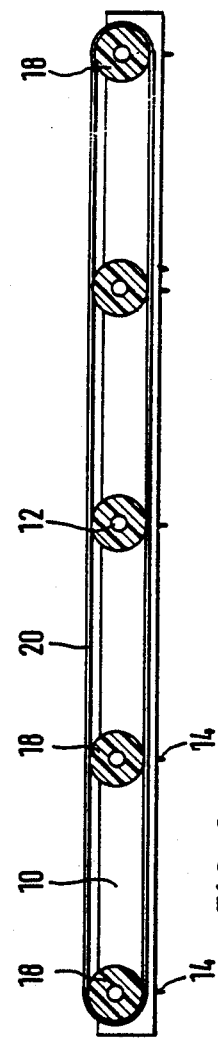
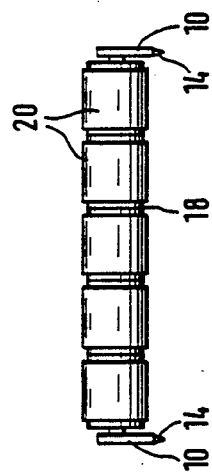
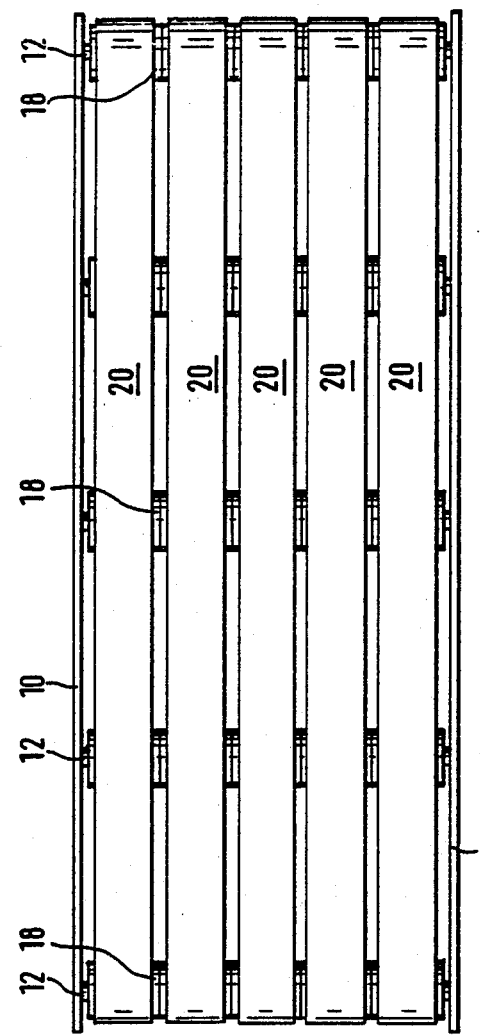
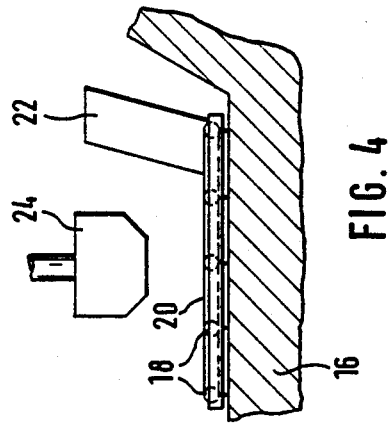
FIG. 2
FIG. 3
FIG. 1
FIG. 4

APPARATUS FOR SAVING AND PROTECTING THE SHOES OF THE DRIVER OF A MOTOR VEHICLE

The invention relates to an apparatus for saving and protecting the shoes of the driver of a motor vehicle.

The driver of a motor vehicle has to change foot pedals frequently, that is, between the gas pedal and the braking pedal while driving. Since the driver sets his foot with the heel onto the floor of the motor vehicle, the heel of the shoe frictionally engages with the heel region of the floor mat during this change on the floor of the motor vehicle. This results in a quick wear of the upper leather of the shoe in the region of the heel.

It is an object of the invention to create an apparatus, which prevents this wear.

A support device is provided in front of the gas and braking pedal according to the invention, where the driver rests his or her foot on the support device. The support device is movable in a cross direction such, that the foot, resting on this support device, carries with its motion the support device between the gas pedal and the braking pedal. Thus, the support device moves relative to the floor of the motor vehicle, while the shoe of the driver does not slide versus the support device. Thus, there occurs no frictional wearing of the shoe.

The support device can also be formed in an embodiment by one or several belt bands running in a cross direction. These belt bands are advantageously endless belts running on rollers. The belts are tightly tensioned such that the foot of the driver finds a stable rest support. In addition, the belt bands comprise material with a certain adhesive effect or an adhesive coating, such that the shoe carries the belt band or, respectively.

In order to achieve an easy displaceability despite the required high tension, advantageously several bands disposed parallel to each other are provided, which, in each case, run over separate rollers. Therefore, only those bands have to be moved, on which shoe of the driver rests in fact. Correspondingly, only the frictional resistance of the rollers deflecting these belt bands have to be overcome.

In order to avoid to much of a bending through of the belt bands under the load of the foot, if required additional support rollers can be provided between the rollers deflecting the belt bands.

The axles of the rollers are supported in a frame, which is disposed on the floor of the motor vehicle and which is maintained non-skid and non-sliding on the floor of the motor vehicle. In addition, the frame can engage the floor with expanded plastic foam strips, bur attachments, arbors, mandrels, and the like.

An economic production with low resistance of the motion of the band results, where the rollers are produced with a self-lubricating plastic material.

According to another embodiment, the support device comprises a plate disposed movable at least in cross direction, but preferably in cross and longitudinal direction, where the driver puts his or her foot onto the plate.

The plate is preferably slidably disposed on a base plate. In order to allow the plate to slide easily on the base plate and to move with the resting foot of the driver, the plate preferably runs on balls, which are supported in cages. It is also possible to provide bulgings at the bottom side of the plate where the plate slides on the bulgings. Ease of motion of the plate is, however not desirable, since otherwise the foot of the driver will not find a sufficient support. If required, therefore, a braking device is provided which reduces the movability of the plate on the base plate. This braking device can be formed from drag members such as, for example, brushes or felt layers, which are applied to the plate and which are in contact with the base plate. These drag members can additionially fulfill the purpose of preventing a penetration of dirt and sand under the plate.

It is also possible to attach permanent magnets to the plate, which magnets pull the plate against the ferromagnetic base plate. Thereby, the contact on pressure of the plate is increased versus the base plate and the frictional resistance of the plate on the base plate is increased.

In order to avoid reliably that the foot of the driver slides on the surface of the plate, the surface of the plate can carry an adhesive layer. It is also possible to provide a heal trough on the surface of the plate, where the driver places his or her foot into the heel trough. Thereby, the plate is carried along during the motion of the foot between the gas pedal and the braking pedal not only friction locking but also shape locking. During change between gas pedal and braking pedal the angle of the foot of the user is changed slightly versus the floor of the vehicle and thus versus the plates. In order to prevent same, the angle change does not result in a frictional rotation of the shoe in the heal trough, the heal trough can advantageously be attached flexibly to the plate.

If desired, the plate itself can be formed as a heel trough slidable on the base plate.

In order to provide a stable support for the foot of the driver, in addition the plate can be maintained in its standard position by weak spring forces, wherein the foot of the driver rests on the gas pedal. In order to brake, the driver has to move the plate with his or her foot against these spring forces toward the braking pedal.

The base plate is attachable in a non-skid manner at the floor of the motor vehicle, where, for this purpose, expanded plastic foam strips, bur attachments, arbors, mandrels, or the like are provided at the bottom side of the base plate.

The width of this device is selected such that a motion of the foot, resting on the support device, is possible between the braking pedal and the gas pedal. The depth of the device in longitudinal direction, i.e. in driving direction, is selected such, that a comfortable resting of the foot is possible, where a slidability of the foot with the plate or, respectively, the heel trough should also be present in a longitudinal direction according to the second embodiment. The height of the device should be kept as low as possible.

The formation of the support device with a frame or a base plate, which can be placed in a vehicle, is preferred for the retrofitting of the vehicle. In case of standard-series equipment of the vehicle, a recess can be provided in the floor pan of the motor vehicle, wherein the support device is movably supported flush with the floor plane of the vehicle.

The possibility also exists to provide a recess for the support device in a foot mat placed in the vehicle, such that the support device rests substantially flush with the surface of the floor mat.

In the following the invention is illustrated in detail by way of embodiments illustrated in the drawing.

There is shown in

FIG. 1 - a side view of the device according to the invention in a first embodiment, FIG. 2 - a front view of this device, FIG. 3 - a plan view of this device FIG. 4 - a front view of the device placed in a motor vehicle.

Figure 6:
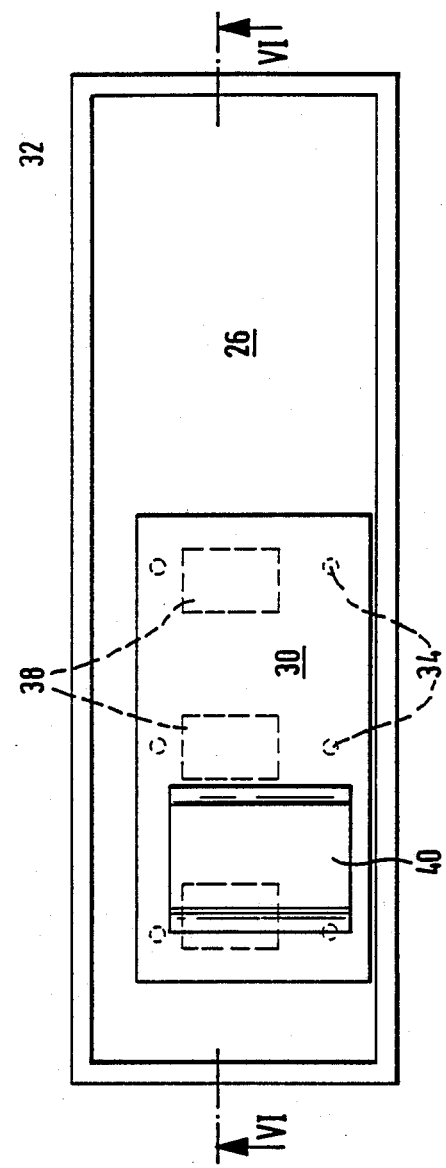
Figure 7:
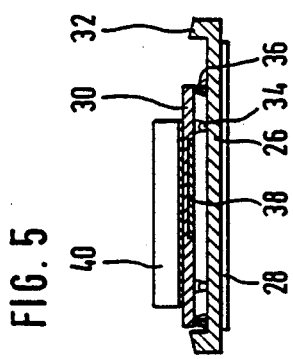
Figure 8:
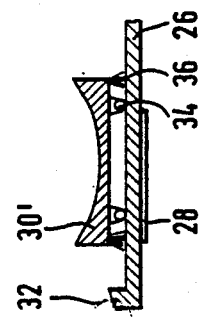

FIG. 5 - a side view of a device according to a second embodiment along the section lines V — V of FIG. 6, FIG. 6 - the device of FIG. 5, according to section lines VI - VI in FIG. 7, FIG. 7 - a plan view unto the device of this second embodiment, and FIG. 8 - a representation according to FIG. 6 of a modification of the second embodiment.

According to the first embodiment, illustrated in FIGS. 1 to 4, the device for the saving and protecting of the shoes of the driver of a motor vehicle comprises a frame, which comprises two side parts 10, which are connected to each other by way of axles 12. The side parts 10 exhibit at their lower edge mandrels 14 or other attachment means with which the frame is resting in a nonskid manner on the floor 16 of the motor vehicle, fixed as illustrated in FIG. 4.

The axles 12 carry free rotable rollers 18 of self-lubricating plastic. Each axle carries several rollers rotatable independent from each other. As shown in the illustrated embodiment, for example 5 rollers 18.

An axle 12 with rollers 18 is respectively supported at the outer ends of the side parts 10, where tightly tensioned endless running belt bands 20 are supported by these rollers 18. The width of these belt bands 20 corresponds to the width of the respective rollers 18 in each case such that the belt bands 20 can be moved independent from each other over the respective rollers 18. The belt bands 20 preferably comprise a flexible plastic, which exhibits a certain surface adhesion.

In order to prevent a sagging of the belt bands 20 between the deflecting rollers, one or several additional axles 12 with rollers 18 can be disposed in the middle region of the side parts 10, in order to support the belt bands 20. According to the embodiment illustrated in the drawing, for example, additional axles 12 with rollers 18 for supporting the belts 20 are provided at uniform distances 3.

The diameters of the rollers 18, the height of the side parts 10 and the support of the axles 12 in the side parts 10, are selected such that the lower half of the belt bands 20 runs slightly above the lower edge of the side parts 10 and thus above the floor 16 of the motor vehicle, while the upper half of the belt bands 20 runs slightly above the upper edge of the side parts 10.

As is illustrated schematically in FIG. 4, the device is disposed at the floor 16 of the motor vehicle, immediately ahead of the gas pedal 22 and the braking pedal 24, whereby it is fixed in this position by mandrels or arbors 14. The driver of the motor vehicle rests his foot on the belt bands 20. While driving, the driver can move his foot back and forth between the gas pedal 22 and the braking pedal 24 without lifting the foot up from the belt bands 20. Based on the adhesion effect of the belt bands 20, the shoe carries along the slidable belt bands 20, on which the shoe rests. The shoe thus does not move versus the support surface such that no friction occurs wearing down the shoe.

The dimensions of the device are congruent to the conditions of use. The width corresponds to the disposition of the gas pedal 22 and the braking pedal 24 and amounts thus to about 30 to 35 cm. Thereby, the foot of the driver, resting on the belt bands 20 can comfortable reach both pedals. The dimension crosswise to the shifting direction of the belt bands 20 amounts to about 10 cm such that sufficient space is available for the resting of the foot.

The width of the individual belt bands 20 amount, for example, to 2 cm, where the belt bands 20 are disposed at a minimal mutual distance of 0.5 cm or less. In case of use, only some of the belt bands 20, on which the shoe of the user rests in fact, are moved such, that only the friction of the rollers 18, coordinated to these belt bands, has to be overcome. The total height of the device shall be as small as possible in order to avoid interfering with the height level coordination of the foot of the driver to the pedal 22 and 24. On the other hand, in order to assure a sufficient diameter of the rollers 18, a height of about 1.5 cm is suitable.

A second embodiment is illustrated in FIGS. 5 to 7.

A base plate 26 is placed on the floor 16 of the motor vehicle in front of the gas pedal 22 and of the braking pedal 24, which base plate 26 is, for example retained unslidably for example with a bur attachment 28 at the floor 16. The base plate 26 corresponds in its length and width dimensions substantially to the device of the first embodiment.

The plate 30 is disposed at the base plate 26, which serves as a rest device for the foot of the driver. The plate 30 exhibits smaller dimensions as compared to the base plate 26 such that it is slidable on the base plate 26 between the gas pedal 22 and the braking pedal 24 and to a certain extent, also perpendicular thereto. An upwardly protruding edge 32 of the base plate 26 serves as a stop and as a path limit for the plate 30.

In order to make the plate 30 easily slidable on the base plate 26, the plate 30 is provided at its bottom side with balls 34, which are retained rotatable in suitable cages. The cages for example, can be formed from the plate 30 itself or can be attached to the bottom side of the plate 30. Also hemispherical stampings can be provided at the plate 30 instead of the balls 34, in order to permit an easy running sliding of the plate 30 on the base plate 26.

A drag member 36, formed as a brush, is attached at the bottom side of the plate 30 along the edge of plate 30, which drag member is in contact with the surface of the base plate 26. This brush-like drag member prevents that dirt collecting on the base plate 26 reaches under the plate 30 and interfere with the slidability of the plate 30. In addition, this sliding member 36 effects a braking of the plate 30 such that this plate 30 provides a slight resistance against the sliding of the foot of the driver and thus provides required support to the foot of the driver.

The base plate 26 can be provided with breakout openings through which dirt, sand or the like can pass such that no interference occurs hereby with the slidability of the plate 30. The breakout openings, of course, have to be disposed outside of the balls 34 or stampings supporting the motion path of the plate 30.

If the plate 30 is too easily slidable and does not provide a sufficient support to the foot of the driver, then, in addition, permanent magnets 38 can be disclosed on the bottom side of the plate 30, which move with a small air gap above the base plate 26 comprising ferromagnetic sheet metal. The magnets 38 pull the plate 30 against the base plate 26 and thus increase the bearing pressure and thus the friction of the balls 34, such that the plate 30 becomes more difficult to slide and provides a more stable support to the foot of the driver.

The plate 30 can exhibit on its surface an adhesive layering for example, a rubber or foam layer. It is thereby achieved that the foot of the driver, during the motion between gas pedal 22 and braking pedal 24, does not slide over the surface of the plate 30, but carries this plate along.

Instead of such an adhesive surface layer, there can also be provided a heel trough 40 at the plate 30, where the driver places his foot into the heel trough 40. The heel trough 40 effects a shape-locking carrying along of the plate 30 upon a motion of the foot. Since the position of the foot versus the plate 30 changes slightly with respect to its angle with a sliding of the plate 30, the heel trough 40 is preferably attached at the plate 30, in a flexible manner, such that it can follow the change of the angle position of the foot without the occurrence of a frictional motion of the foot versus the heel trough 40.

In order to provide a sufficient support to the foot of the driver despite a slidability of the plate 30, there can be provided, according to a further variant, that the plate 30 is retained in standard position with pull springs, which are inserted between the plate 30 and the base plate 26, where the foot of the driver rests at the gas pedal 22 in a standard position. In order to brake, the driver has to move the foot together with the plate 30 against the relatively small force of these pull springs according this embodiment. According to this embodiment, an easy-running guiding of the plate 30 and of the base plate 26 is possible.

A modification of the embodiment of FIGS. 5 to 7 is illustrated in FIG. 8. Instead of the heel trough 40, placed on the plate 30, the plate 30' itself is formed as a heel trough, which rests slidably, immediately on the base plate 26.

The total apparatus, in particular in the embodiment of FIGS. 5 to 8 the heel trough, is preferably provided with luminescent points or the like, in order to allow the driver to place his foot without problem into the heel trough, even in case of darkness.

I claim:

1. An apparatus for saving and protecting the shoes of a driver of a motor vehicle, comprising: a support device for resting the foot of a driver, said support device being disposed in front of the gas pedal and the braking pedal of a motor vehicle and being movable with the foot at least in a cross direction, and said support device comprising at least one belt (20).

2. Apparatus according to claim 1, characterized in that, said at least one belt band is an endless circulating band.

3. Apparatus according to claim 2, characterized in that, said at least one belt band is circulating tightly tensioned over freely rotatable rollers (18).

4. Apparatus acording to claims 2 or 3, including a plurality of belt bands (20), with each band circulating over separately rotatable rollers (18).

5. Apparatus according to claim 3, characterized in that, additional freely rotatable rollers (18) support said at least one belt band in the direction of motion of the at least one belt band between the deflecting roller (18).

6. Apparatus according to claim 3, characterized in that the rollers (18) are supported in a frame fixed on the floor (16) of the motor vehicle.

7. Apparatus according to claim 1 characterized in that the at least one belt band is of a flexible plastic material.

8. Apparatus according to claim 3, characterized in that the rollers (18) comprise a self lubricating plastic material.

9. An apparatus for saying and protecting the shoes of a driver of a motor vehicle having a floor, comprising; a support device for resting the foot of the driver, said support device being disposed in front of the gas pedal and braking pedal of a motor vehicle and being movable with the driver's foot at least in a cross direction, and said support device comprising a plate (30) slidably supported on a base plate (26), said base plate position on said floor (16); whereby no friction occurs between the plate and the driver's shoe during sideways movement of the driver's foot.

10. Apparatus according to claim 9, characterized in that the plate (30) is supported by balls (34) held in position by way of cages on the base plate (26).

11. Apparatus according to claim 9, characterized in that the plate (30) is supported on the base plate (26) by way of protrusions.

12. Apparatus according to claim 9, characterized in that the path of motion of the plate (30) is limited by side stops (32) of the base plate (26).

13. Apparatus according to claim 9, characterized in that the motion of the plate (30) is braked.

14. Apparatus according to claim 13, characterized in that magnets (38) pulling against the base plate (26) are provided for the braking of the plate (30).

15. Apparatus according to claim 13, characterized in that drag members (36) are applied at the plate (30) for braking, which drag members are in contact with the base plate (26).

16. Apparatus according to claim 9, characterized in that the plate (30) is provided with an adhesive surface layer.

17. Apparatus according to claim 9, characterized in that a heel trough (40) is disposed at the plate (30).

18. Apparatus according to claim 17, characterized in that the heel trough (40) is disposed flexible at the plate (30).

19. Apparatus according to claim 9, characterized in that the plate (30') is formed as a heel trough.

20. Apparatus according to claim 9, characterized in that the plate (30) is retained in a standard position by spring forces.

21. Apparatus according to claims 9, characterized in that the base plate (26) can be fixed at the floor (16) of the motor vehicle.

* * * * *